(12) United States Patent
Leichter et al.

(10) Patent No.: US 7,452,298 B2
(45) Date of Patent: Nov. 18, 2008

(54) COMPACT DRIVE

(75) Inventors: Thomas Leichter, Karlsruhe (DE); Jochen Mahlein, Karlsruhe (DE); Josef Schmidt, Graben-Neudorf (DE); Bernhard Köhler, Bruchsal (DE)

(73) Assignee: Sew-Eurodrive GmbH & Co. KG, Bruschal (DE)

( * ) Notice: Subject to any disclaimer, the term of this patent is extended or adjusted under 35 U.S.C. 154(b) by 162 days.

(21) Appl. No.: 10/556,222

(22) PCT Filed: Apr. 2, 2004

(86) PCT No.: PCT/EP2004/003492

§ 371 (c)(1),
(2), (4) Date: Nov. 9, 2005

(87) PCT Pub. No.: WO2004/100340

PCT Pub. Date: Nov. 18, 2004

(65) Prior Publication Data

US 2007/0142139 A1    Jun. 21, 2007

(30) Foreign Application Priority Data

May 9, 2003    (DE) ................................. 103 21 093
Jun. 24, 2003  (DE) ................................. 103 28 228

(51) Int. Cl.
*F16H 48/06* (2006.01)
(52) U.S. Cl. ..................................................... 475/149
(58) Field of Classification Search .................. 475/149
See application file for complete search history.

(56) References Cited

U.S. PATENT DOCUMENTS 3,149,499 A    9/1964  Schmitter et al.
5,568,858 A *  10/1996 Thompson ............. 198/781.06
5,950,797 A *  9/1999  Aulanko et al. ............ 198/330
6,155,364 A *  12/2000 Nagano et al. ............. 180/65.2
6,169,345 B1   1/2001  Bloch et al.
6,358,172 B1*  3/2002  Hiegemann .................... 475/5
6,492,742 B1*  12/2002 Fujikawa et al. .......... 290/40 C
6,577,034 B1   6/2003  Kitamura et al.
7,069,803 B2   7/2006  Schunke et al.
7,143,664 B2   12/2006 Schunke et al.

(Continued)

FOREIGN PATENT DOCUMENTS

DE    77 18 904    5/1978

(Continued)

OTHER PUBLICATIONS

Anonymous, "Die Getriebemotoren; KEB Combigear," Apr. 15, 2003, XP002290505, http://www.keb.de/common/catalogues/Produkt/000000099D3-06-01.pdf.

(Continued)

*Primary Examiner*—Ha D. Ho
(74) *Attorney, Agent, or Firm*—Kenyon & Kenyon LLP

(57) ABSTRACT

A compact drive includes at least an electric motor, a transmission, and a frequency converter, the output shaft of the transmission and the rotor shaft being parallel to each other, and the shaft-center distance at least being determined by a spur-gear stage of the transmission or by the design of a variable transmission.

20 Claims, 7 Drawing Sheets

U.S. PATENT DOCUMENTS 7,191,678 B2  3/2007  Schunke et al.

FOREIGN PATENT DOCUMENTS

| | | |
|---|---|---|
| DE | 42 01 373 | 8/1992 |
| DE | 197 14 784 | 10/1998 |
| DE | 199 13 833 | 10/1999 |
| DE | 199 81 897 | 3/2001 |
| DE | 201 07 324 | 6/2001 |
| DE | 201 07 326 | 6/2001 |
| DE | 100 49 883 | 4/2002 |
| DE | 202 07 519 | 7/2002 |
| DE | 103 17 749 | 1/2004 |
| EP | 0 993 098 | 4/2000 |
| EP | 1 049 234 | 11/2000 |
| EP | 1 231 701 | 8/2002 |
| GB | 2 252 137 | 7/1992 |
| JP | 2002 336305 | 11/2002 |

OTHER PUBLICATIONS

International Search Report from International Patent Application No. PCT/EP2004/003492, Nov. 11, 2004.

Translation of International Preliminary Report on Patentability from International Application No. PCT/EP2004/003492, Mar. 23, 2006.

* cited by examiner

COMPACT DRIVE

FIELD OF THE INVENTION

The present invention relates to a compact drive.

BACKGROUND INFORMATION

German Published Patent Application No. 197 14 784 describes a compact drive, which includes an electric motor, at whose one end face a transmission is situated, and at whose other end face a frequency converter is situated. The electronics region and the motor region must be sealed with respect to the transmission. In this context, it may be disadvantageous that the axial length is long and that a power take-off can only be provided at one end face of the compact drive.

SUMMARY

An example embodiment of the present invention may provide a compact drive that may eliminate the above-mentioned disadvantages. For example, axial length may be reduced and as many power take-off variants as possible may be implementable, i.e., one-sided and two-sided power take-off.

A compact drive according to an example embodiment of the present invention may include at least an electric motor, a transmission, and a frequency converter, the output shaft of the transmission and the rotor shaft being parallel to each other.

It may be provided that the overall axial length is reducible and one-sided and two-sided power take-off may be implemented.

The electric motor may be a synchronous motor. It may be provided that high-speed positioning tasks may be executed by the compact drive and/or a high torque may be available over the entire speed range.

The frequency converter may be positioned laterally with respect to the rotor shaft. It may be provided that the overall length is reducible and the two sides of the output shaft are accessible, i.e., a two-sided power take-off may be provided.

The transmission region may be sealed with respect to the surroundings, and with respect to the motor region and the compartment for the electronics. It may be provided that the transmission region may include lubricating oil, and that the electronics and the stator and rotor parts remain protected from the lubricant.

The transmission region, the region of the motor, and the electronics compartment may be at approximately the same temperature. It may be provided that no thermal barriers are necessary, and therefore, material may be dispensed with and mass and costs may be reduced.

The motor may include a sensor situated at the one end of the rotor shaft. It may be provided that the compact drive may be used for positioning tasks and that the sensor may be protected by the housing of the compact drive. A brake, which may also be protected by the compact drive, is connectable at or to the other end of the rotor shaft.

The motor may not include a sensor, but the position may be ascertained with the aid of an estimation method. This may allow axial space to be saved.

The rotor shaft may remain completely in the interior of the housing, and therefore, no seals may be necessary from the rotor shaft to the surroundings. Consequently, a single shaft sealing ring running on the rotor shaft may be sufficient. Since the rotor shaft may have a high speed, the amount of heat generated may therefore be much less than in the case of a motor having two shaft sealing rings, e.g., on its two axial ends of the rotor shaft.

The output shaft may have three shaft sealing rings. However, since the speed is much less than in the case of the rotor shaft, the entire amount of heat generated may be less than in the case of a design approach for the drive, where both the rotor shaft and the output shaft have two shaft sealing rings.

In an example embodiment of the transmission, at least one spur-gear stage may be used, which means that the overall axial length may decrease and a solution optimal with regard to costs may be produced.

The transmission stage may be arranged as a variable transmission having a variable transmission ratio, which means that the wear of the transmission stage may be minimized by the speed range, and the torque transmission may be adjusted to the loading case. In the case of the variable transmission, it may be provided that all of the seals for the engine compartment region may even be dispensed with, since a variable transmission, e.g., a continuously variable wide-belt transmission, may require no lubricant or only insignificant amounts of lubricant. Therefore, only seals from the interior of the compact drive to the external environment may be necessary.

The rotor shaft and at least one shaft of the transmission may be supported in the same housing part. It may be provided that the shafts may already be accurately aligned with each other during the manufacturing and machining of the housing part, for the housing part may be finished during only one instance of chucking, and the relative position of the bearing seats may therefore be aligned in a very accurate manner.

Further aspects and features hereof are described below with reference to the appended Figures.

LIST OF REFERENCE NUMERALS 1 bearing
2 shaft sealing ring
3 housing cover
4 cooling devices
5 shaft sealing ring
6 bearing
7 shaft sealing ring
8 output shaft
9 bearing
10 gear wheel
11 stator
12 permanent magnets
13 rotor shaft
14 pinion
15 shaft sealing ring
16 stator winding
17 electronics compartment
18 bearing
19 resolver stator
20 bearing
21 housing part
22 housing part
23 resolver rotor
31 electronics compartment
40 transmission
51 housing cover
52 housing part
53 lower housing cover
54 smooth grooves
55 power electronics 56 printed circuit board
57 bearing
58 plug-and-socket connector part
59 laminated stator core
60 bearing
61 potentiometer
62 board having connection terminals for motor supply lines
63 plug-and-socket connector part
64 pinion
65 bearing
66 gear wheel
67 gear wheel
68 pinion shaft
69 bearing
70 bearing
71 gear wheel on output shaft
72 bearing
73 output shaft manufactured as a hollow shaft
74 pinion shaft
171 opening for mounting the first intermediate shaft
172 opening for mounting second intermediate shaft
173 PG screw joints

DETAILED DESCRIPTION

Figure 4:
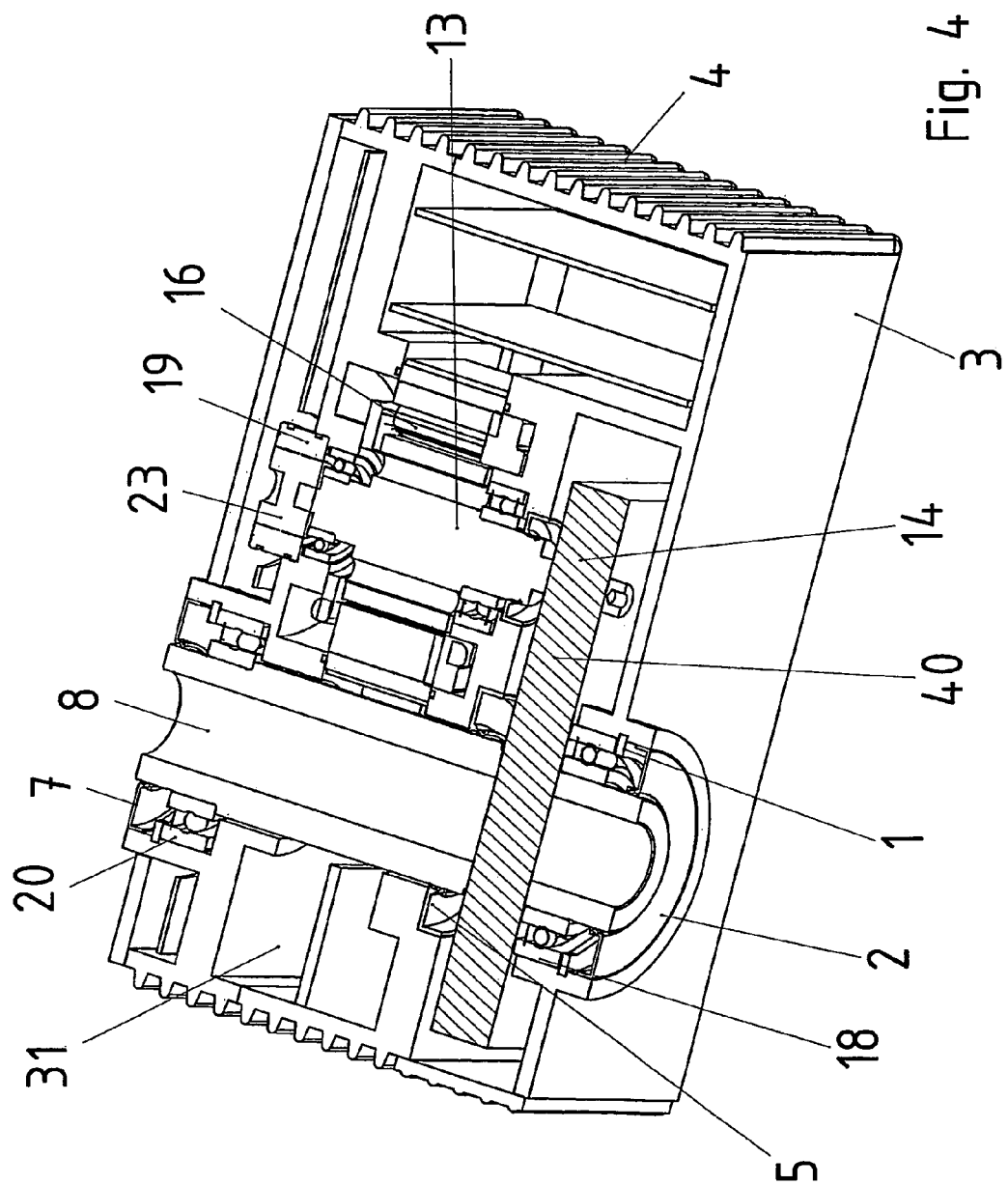
FIG. 4 is a cross-sectional view of a compact drive according to an example embodiment of the present invention.

An oblique view of a compact drive according to an example embodiment of the present invention is illustrated in FIG. 4, whereby transmission 40 is illustrated schematically.

Figure 1:
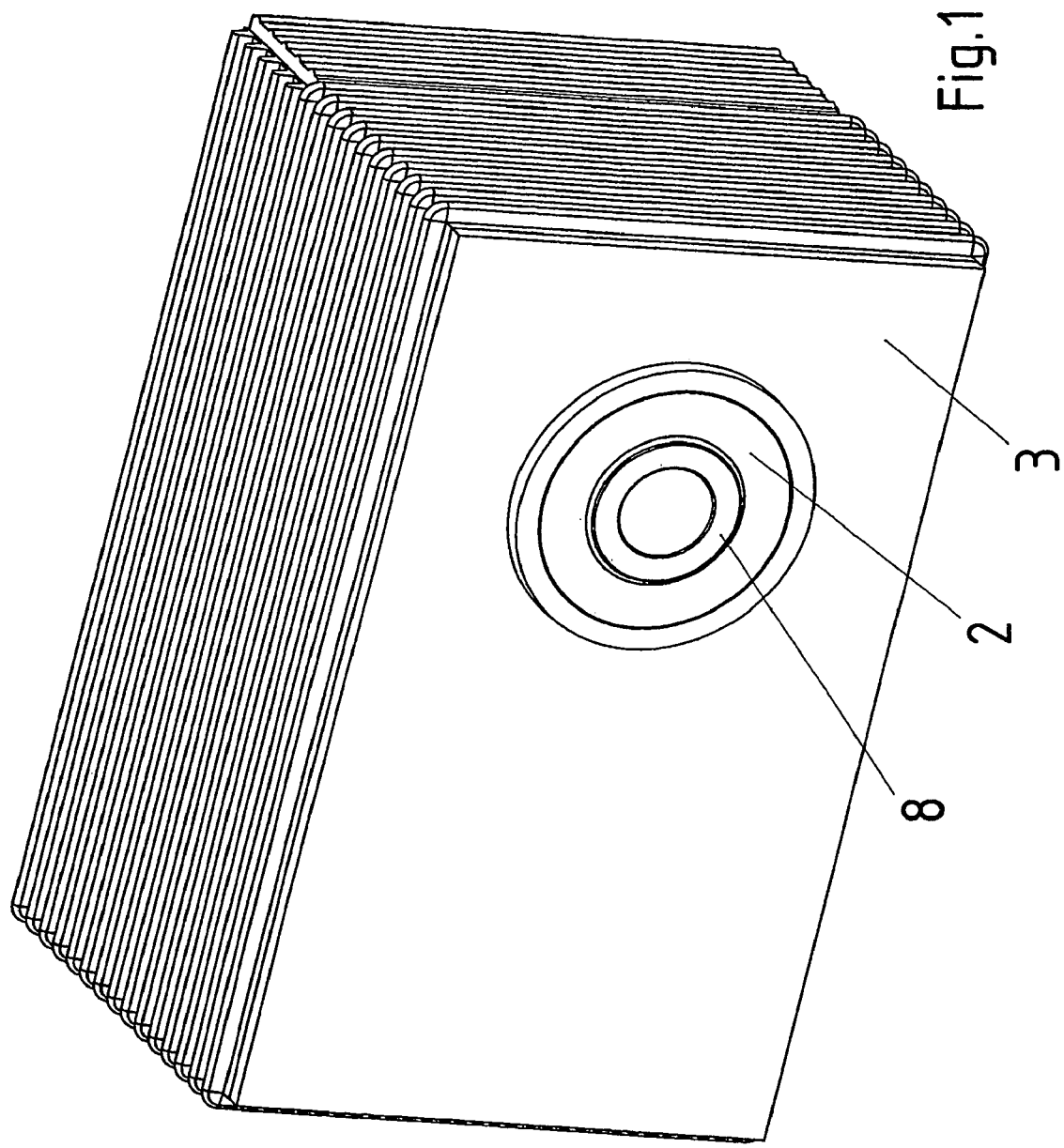
FIG. 1 is a perspective view of a compact drive according to an example embodiment of the present invention.

A perspective view of a compact drive according to an example embodiment of the present invention is illustrated in FIG. 1.

Figure 2:
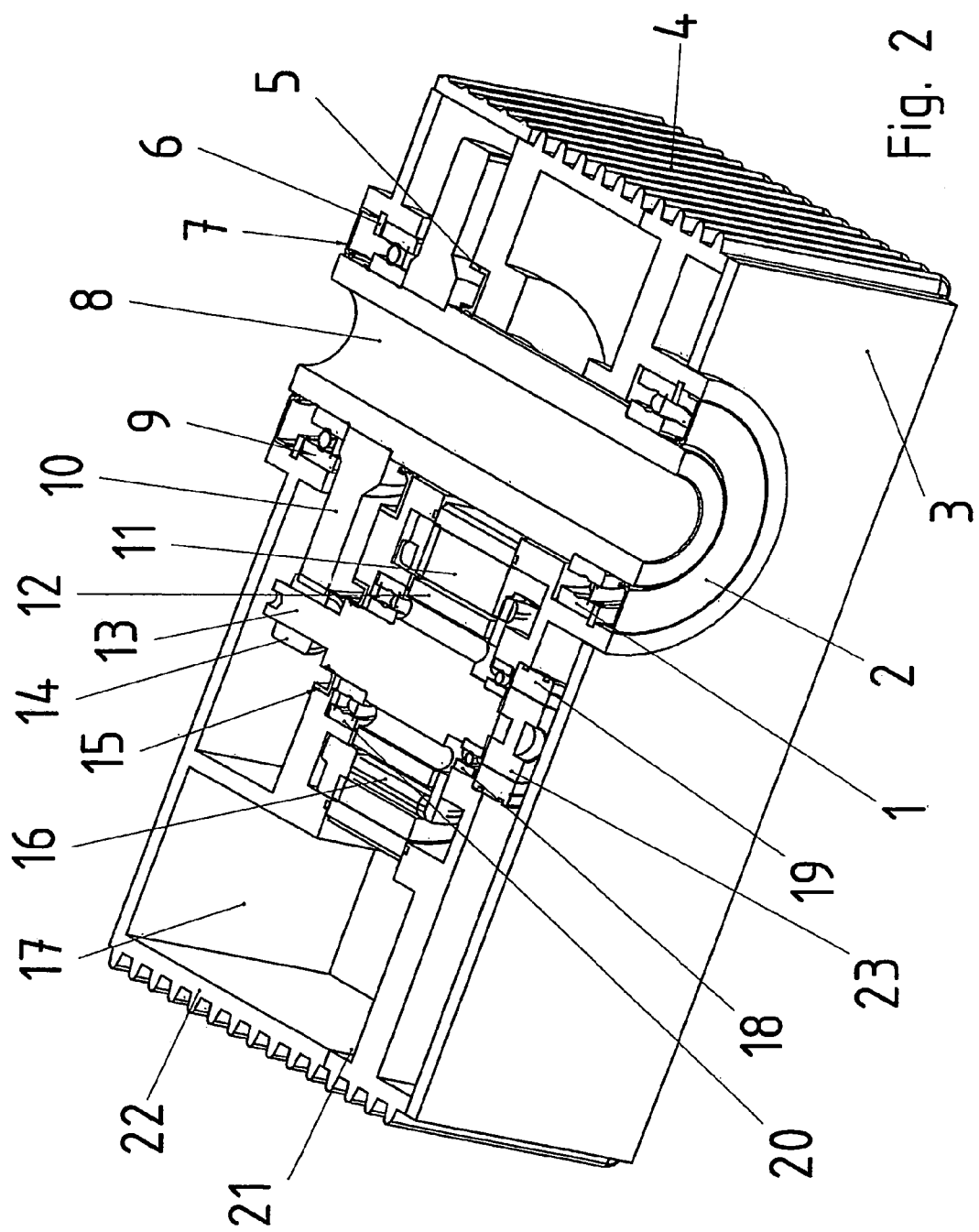
FIG. 2 is a cross-sectional view of the compact drive illustrated in FIG. 1.

A cross-sectional view of the compact drive illustrated in FIG. 1 is illustrated in FIG. 2.

Figure 3:
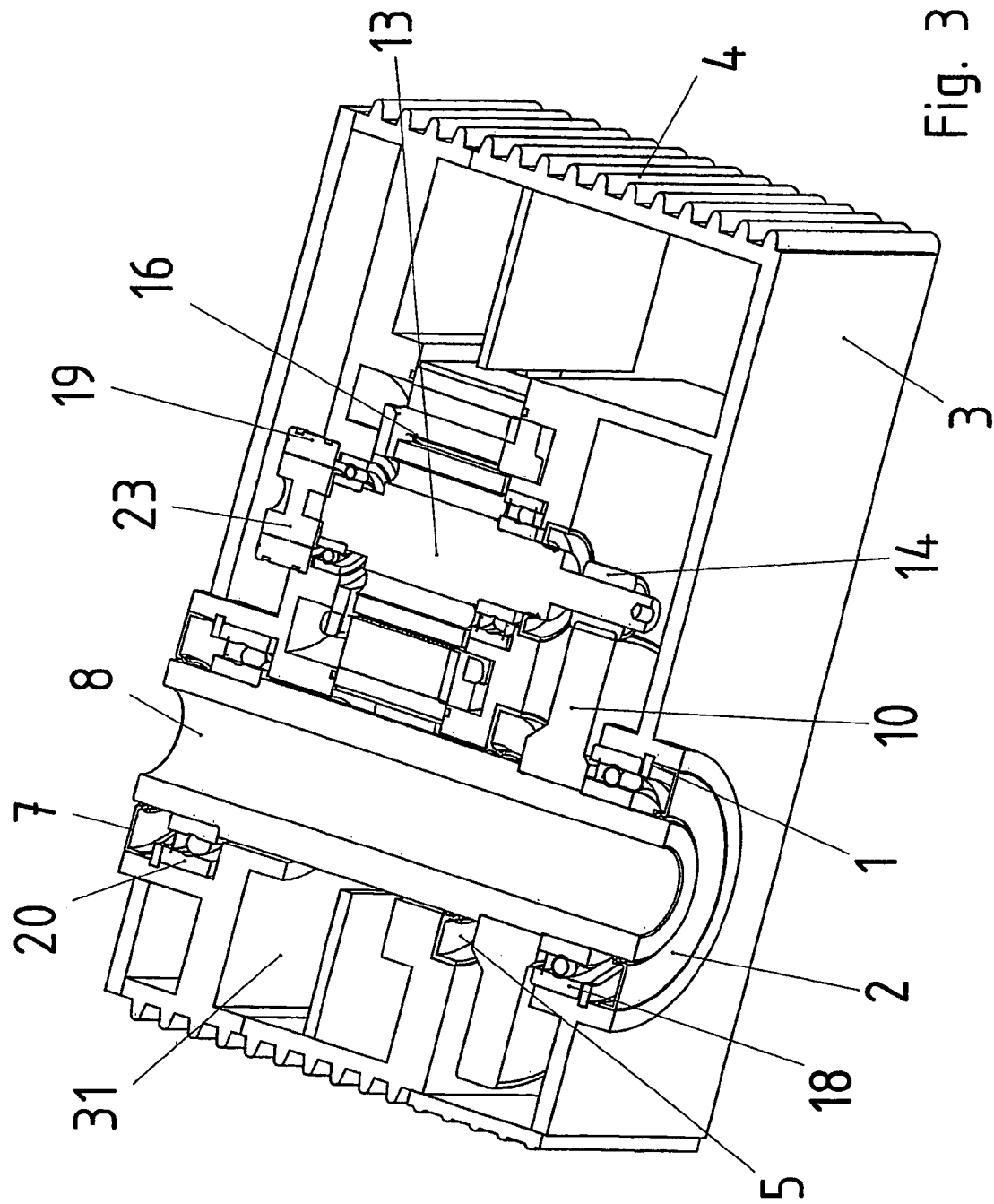
FIG. 3 is a cross-sectional view of a compact drive according to an example embodiment of the present invention.

Illustrated in FIG. 3 is a cross-sectional view of a compact drive according to an example embodiment of the present invention, where, in contrast to FIG. 2, the frequency converter and the motor are arranged on different sides of the output shaft.

Figure 5:
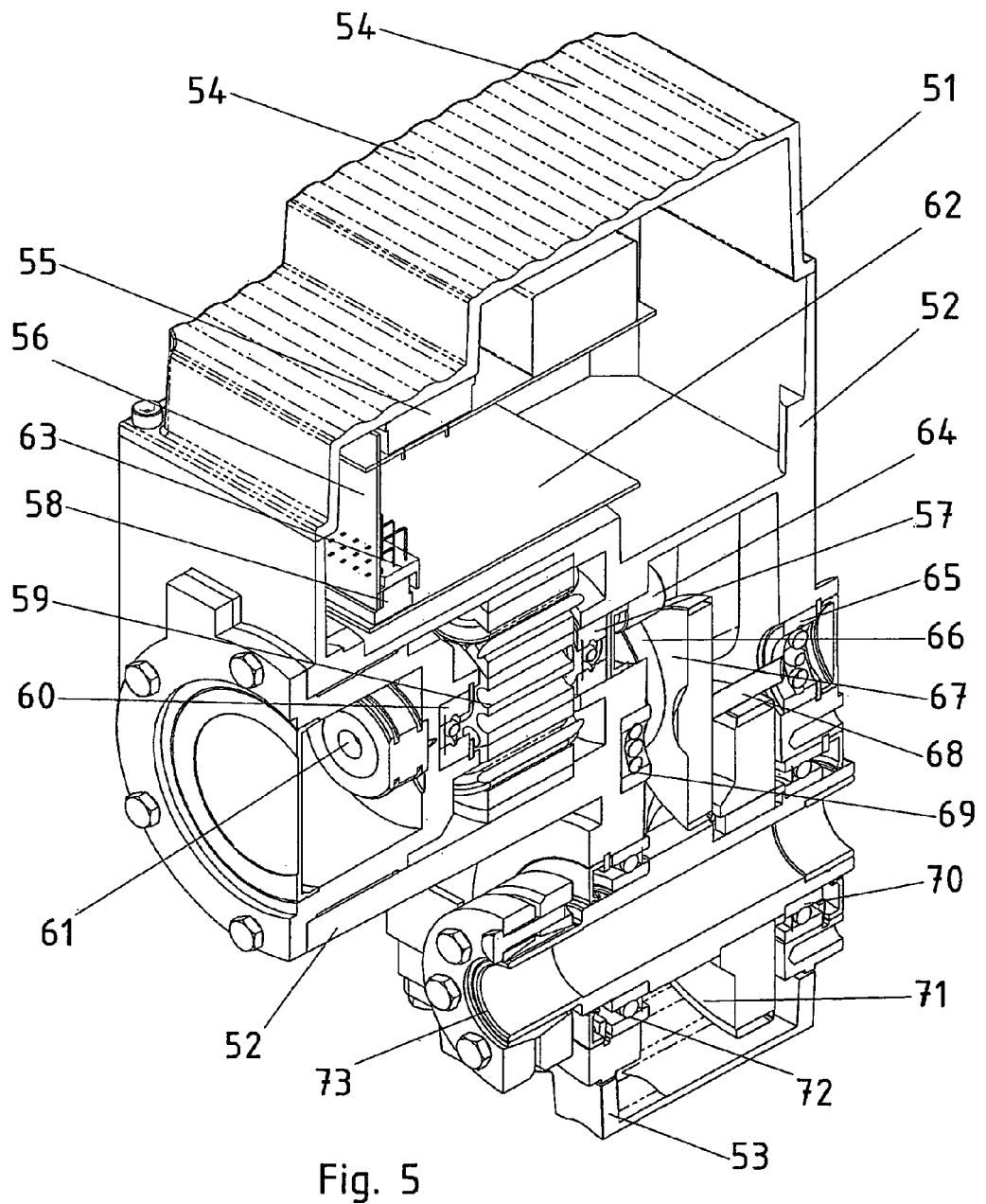
FIG. 5 is a cross-sectional view of an example embodiment of the present invention including a three-stage transmission.

Illustrated in FIG. 5 is an exemplary embodiment of the present invention, in which a three-stage transmission is implemented.

Figure 6:
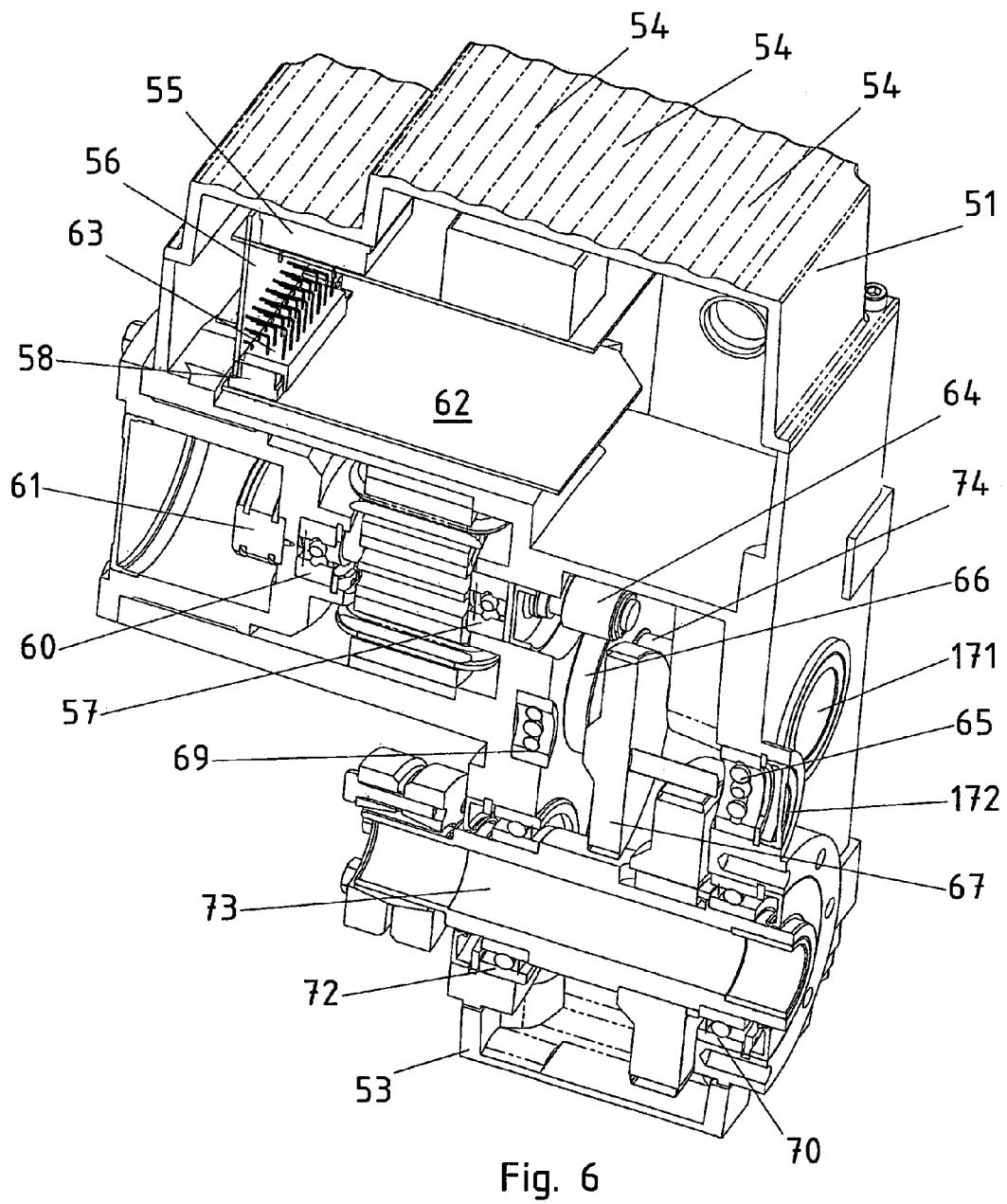
FIG. 6 is another cross-sectional view of the example embodiment illustrated in FIG. 5.

FIG. 6 is a view different from that in FIG. 5.

Figure 7:
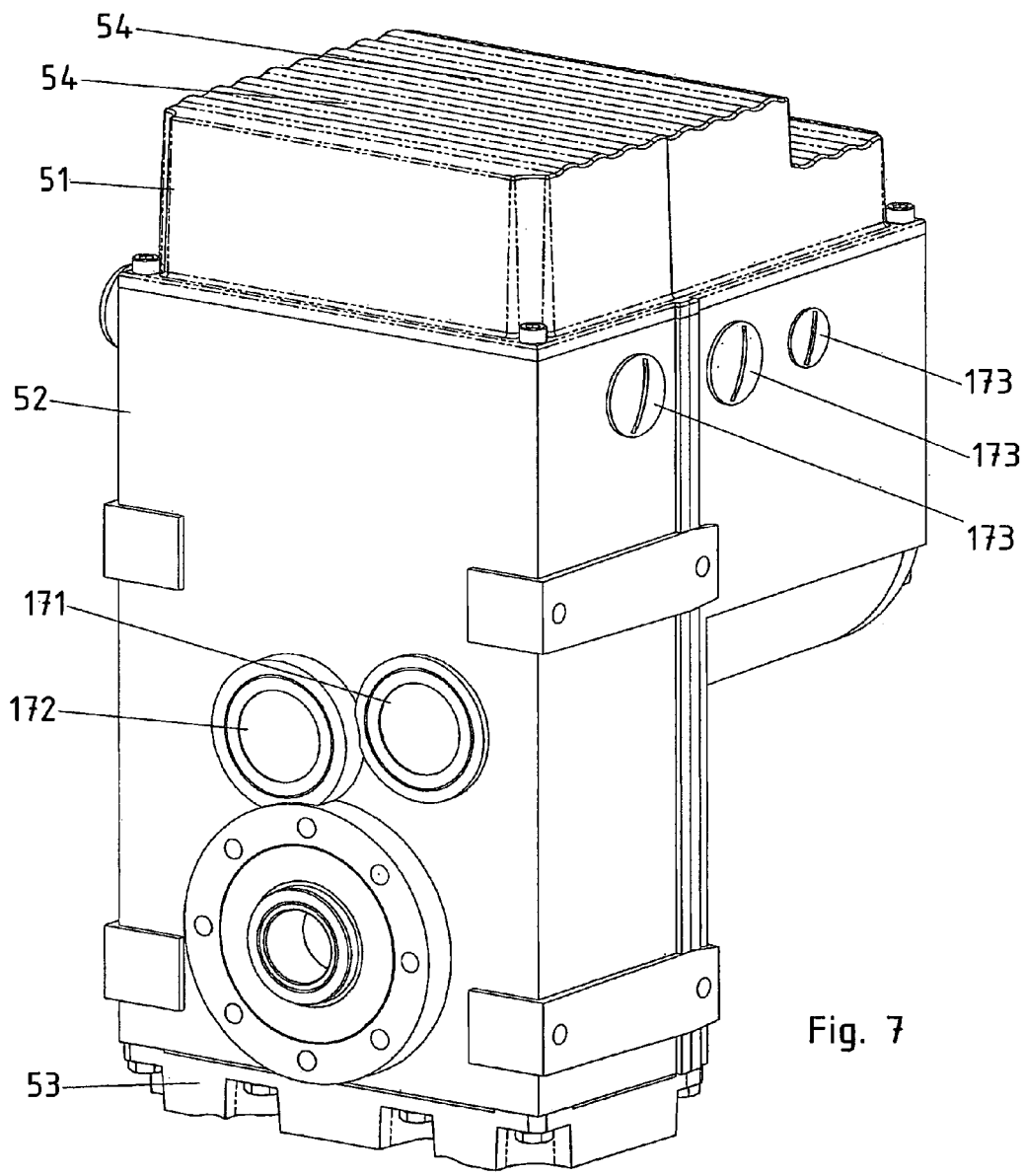
FIG. 7 is a perspective view of the example embodiment illustrated in FIGS. 5 and 6.

FIG. 7 is an external view of the exemplary embodiment illustrated in FIG. 5.

In each instance, transmission 40 symbolically indicated in FIG. 4 is implemented differently in different example embodiments hereof. In a first variant, it is arranged as a spur-gear transmission, which is also illustrated in FIGS. 2 and 3. In another variant, the transmission illustrated in FIG. 4 is arranged as a variable transmission. This variable transmission may be manufactured in the form of a VARIMOT transmission of the company SEW-EURODRIVE, i.e., so as to have two disks rubbing together, or in the form of a VARIBLOC transmission of the company SEW-EURODRIVE, i.e., as a continuously variable wide-belt transmission, the spacing of the two conical adjusting disks determining the transmission ratio. A chain may be used instead of a v-belt.

In the exemplary embodiment illustrated in FIG. 2, the motor is positioned laterally with respect to the output shaft. Therefore, rotor shaft 13 and output shaft 8 are parallelly situated. The center-to-center distance of these shafts is determined by the engaging parts of the spur-gear transmission stage, which include a pinion 14 connected to rotor shaft 13 in a form-locked or friction-locked manner and a gear wheel 10, which is manufactured as a spur gear and is connected to output shaft 8.

The compartment of the transmission, i.e., the spur-gear transmission stage, is sealed with respect to the space of the electric motor. Shaft sealing ring 15 seals these compartments at the rotor shaft, since the rotor shaft carries permanent magnets 12 in the compartment of the motor, as well as pinion 14 in the compartment of the transmission. Shaft sealing ring 5 seals the compartment of the transmission with respect to the compartment of the motor and output shaft 8, which is manufactured as a hollow shaft.

A different transmission including several transmission stages may be used instead of the spur-gear transmission stage illustrated.

The output shaft may not take the form of a hollow shaft, but rather may take the form of a solid shaft. In addition, it is also possible to arrange the output shaft according to the standard for robot interfaces, which means that a highly compact power take-off having a short overall axial length may be produced.

Output shaft 8 is supported by bearing 1 in the same housing part 21, in which rotor shaft 13 is also supported by bearing 18.

The compartment of the motor is sealed with respect to the environment, using the shaft sealing ring 2 that is arranged on output shaft 8 and is inserted into housing cover 3.

Housing parts 21 and 22 are provided with cooling devices 4 for dissipating the heat generated in the motor, transmission, and frequency converter.

Output shaft 8 is supported by the other axially opposite bearing (6, 9) in the same housing part 22, in which rotor shaft 13 is also supported by the other bearing 20.

The compact drive hereof may provide that no coupling may be necessary between the motor and the transmission, which consequently may eliminate the need for additional parts. In particular, the motor and transmission may even use the same housing parts in unison. In addition, it is possible to already accurately align the shafts with respect to each other during the processing and machining of the housing part, in that the relative position of the bearing seats for the motor and the transmission, e.g., in particular of bearings 9 and 20, may be set in an extremely accurate manner during manufacturing, for the housing part may be finished in only one machine tool in only one instance of chucking, and therefore the relative position of the bearing seats may be adjusted in a very accurate manner. The common usage of a housing part may provide that, in this manner, the compact drive not only may require a small volume, but also may have a particularly high strength, since the forces of the motor and the transmission are transmitted to each other inside the same housing part.

The compartment of the transmission is sealed with respect to the environment, using the shaft sealing ring 7 that is arranged on output shaft 8 and is inserted into housing cover 22.

Stator 11 having stator windings 16 is positioned around rotor shaft 13.

This electric motor may be a multiphase synchronous motor. However, any other motor may be integrated into the compact drive instead of the synchronous motor.

Shaft sealing ring 15, which is arranged on the rotor shaft and is inserted into housing part 22, seals the compartment of the transmission with respect to the compartment of the motor. Electronics compartment 17 for the frequency converter is not sealed with respect to the compartment of the motor.

On its one axial end, the motor supports a resolver, which includes a resolver stator 19 and a resolver rotor 23.

Instead of the resolver, other angular-position sensors or angular-velocity sensors may be provided. A brake may also be integrated into the compact drive on the side opposite to the angular-position sensor.

The frequency converter may be operated such that, with the aid of a method, the angular value is estimated, using a suitable motor model. This may allow the overall axial length to be further reduced.

As illustrated in FIG. 2, electronics compartment 31 may not be directly adjacent to the compartment of the motor, but output shaft 8 may be arranged between them. In this example, shaft sealing ring 5 seals the compartment of the transmission with respect to electronics compartment 31, shaft sealing ring 5 being arranged on output shaft 8 and being seated in housing part 21.

The transmission may be filled with lubricant, such as lubricating oil, lubricating grease, etc.

No particularly effective thermal barrier may be provided between the compartments of the frequency converter, i.e., the electronics compartment, and the transmission compartment and the motor compartment. Consequently, the compartments are at approximately the same temperature level. An approximately equal temperature level means a maximum temperature difference of 10° C. during continuous operation at nominal load. A larger temperature difference of the compartments is achievable in the case of short-term, intermittent operation. This may provide that no special thermal barrier may be necessary, and that the amount of material, mass, and costs may therefore be reduced.

Thermal barriers may also be provided between two or more of the compartments.

The motor may be multipolar, e.g., eight-poled or ten-poled. The motor may be arranged as described, for example, in German Published Patent Application No. 100 49 883 or German Published Patent Application No. 103 17 749. Therefore, a single transmission stage, together with such a multiphase motor, is sufficient to cover a wide range of transmission ratios.

Not a hollow shaft, but rather a cylindrical shaft stub may be arranged as an output shaft, this output shaft being connectible to the device to be driven, via a feather-key connection.

The output shaft and the output-side housing part may be manufactured in accordance with robot interface EN-ISO 9402-1. This may allow the overall axial length to be reduced and a high torque to be transmitted. In addition, compatibility with corresponding devices to be driven and connected may be achieved.

The electrical connection terminals are provided on the back of the housing and are therefore not visible in FIGS. 1 through 4. However, other positions for the connection terminals may also be provided.

The connection terminals may be arranged as a power supply. For example, only electric power cables may be extended to the compact drive. In this context, the transmission of data to the frequency converter or from the frequency converter to another, e.g., superordinate or master unit is accomplished by modulating them upon the power lines, the transmission of data being necessary for the data communication. The modulation may be accomplished in a conventional manner, e.g., as may be conventional from powerline communication or according to FSK or the FH/PSK method, i.e., Frequency Hopping Phase Shift Keying.

Different views of an exemplary embodiment are illustrated in FIGS. 5, 6, and 7, a three-stage transmission being implemented.

In this context, housing cover 51 is provided for covering the electronics and is rigidly, though detachably, connected to housing part 52 so as to form a seal. The housing cover is also used for dissipating the heat of power electronics 55 and, to this end, is connected to it in a thermally conductive manner. In addition, the housing cover has smooth grooves 54, i.e., substantially parallel, undulating peaks and depressions, which have the function of a heat sink; liquids, such as water or juice, being able to drain off easily, and the risk of corrosion and soiling of the housing being consequently reduced. Housing part 52 has the function of forming the housing for the motor and the transmission, a lower housing part 53 being provided on it.

The electronics include several boards, which are interconnected electrically and/or mechanically.

Three of these boards are schematically indicated, a first supporting signal electronics and power electronics 55, a second board 56 connected to the first board supporting a plug-and-socket connector part 58.

The rotor shaft of the motor is supported in housing part 52 by bearings 57 and 60 and is connected to a potentiometer 61 on one of its ends.

Laminated stator core 59 is connected in housing part 52. Board 62 is manufactured to have connection terminals for motor supply lines and network supply lines. Other lines may also be connectable, such as temperature-sensor lines for the stator windings of the motor and lines of potentiometer 61 provided on the one end of the rotor shaft. The signal electronics and power electronics are electrically connected via plug-and-socket connector part 58, which is connected on mounting board 62, e.g., soldered, and via corresponding plug-and-socket connector part 63, which is connected to mounting board 56. The power supplied to the electronics is also fed to board 62 via PG screw joints 173.

Pinion 64 is rigidly connected to the rotor shaft They may be manufactured in one piece, pinion 64 engaging with a gear wheel 66, which is mounted on a first intermediate shaft that carries a pinion-shaft segment 74. This last-mentioned pinion-shaft segment engages with a gear wheel 67, which is mounted on a second intermediate shaft. Bearings 65 and 69 are used for supporting the second intermediate shaft, which supports gear wheel 67 and includes a pinion-shaft segment 68. Pinion-shaft segment 68 engages with a gear wheel 71, which is mounted on output shaft 73 that is arranged as a hollow shaft.

Output shaft 73 is supported by bearings 70 and 72 in housing part 52.

Mounting opening 171 for the first intermediate shaft and mounting opening 172 for the second intermediate shaft are illustrated in FIG. 7. They are imperviously sealed by suitable covering device(s).

PG screw joints 173 are provided on housing part 52 and are used for feeding cables through to the connection terminals of board 62. Electric conductor tracks lead from there to plug-and-socket connector 58, and from there to the electronics, via plug-and-socket connector 63 and board 56. The supply lines for the motor extend from power electronics 55, via board 56 and plug-and-socket connectors 58 and 63 and the connection terminals on board 62, to the stator of the motor.

What is claimed is:

1. A compact drive, comprising:
    an electric motor;
    a transmission;
    a frequency converter; and
    a housing including at least one housing part and at least one housing cover;
    wherein an output shaft of the transmission and a rotor shaft of the electric motor are arranged in parallel, a shaft-center distance determined in accordance with at least one transmission stage;
    wherein the frequency converter is arranged laterally in a direction orthogonal with respect to the rotor shaft; and
    wherein the two sides of the output shaft are accessible to provide a two-sided power take-off.

2. The compact drive according to claim 1, wherein the at least one transmission stage includes a spur-gear transmission stage.

3. The compact drive according to claim 1, wherein the at least one transmission stage includes a variable transmission.

4. The compact drive according to claim 1, wherein the at least one transmission stage includes one of (a) a continuously variable, wide-belt transmission and (b) a chain drive.

5. The compact drive according to claim 1, wherein the electric motor includes at least one of (a) a synchronous motor and (b) a permanent-magnet motor.

6. The compact drive according to claim 1, wherein a transmission region of the compact drive is sealed with respect to the environment, with respect to a region of the electric motor and with respect to an electronics compartment.

7. The compact drive according to claim 1, wherein a transmission region of the compact drive, a region of the electric motor and an electronics compartment are at approximately a same temperature level.

8. The compact drive according to claim 1, wherein the electric motor includes a sensor.

9. The compact drive according to claim 1, wherein the electric motor includes a sensor including a resolver stator and a resolver rotor.

10. The compact drive according to claim 1, wherein the rotor shaft and at least one shaft of the transmission are supported in a same housing part.

11. The compact drive according to claim 1, wherein the rotor shaft includes a single shaft-sealing ring.

12. The compact drive according to claim 1, wherein the output shaft includes three shaft-sealing rings.

13. The compact drive according to claim 1, further comprising a housing including two housing parts and one housing cover.

14. The compact drive according to claim 1, further comprising electrical connection terminals for load leads arranged on a housing part of the compact drive.

15. The compact drive according to claim 14, further comprising at least one electronic circuit adapted to at least one of (a) modulate and (b) demodulate information onto the load leads.

16. The compact drive according to claim 1, further comprising a housing including at least one region having peaks and depressions adapted to at least one of (a) drain off liquids and (b) dissipate heat.

17. The compact drive according to claim 16, wherein the peaks and depressions include at least one of (a) grooves and (b) corrugations.

18. The compact drive according to claim 17, wherein a resistance to heat transfer from the corrugations to ambient air is less than a resistance to heat transfer from a planar region of the housing to ambient air.

19. The compact drive according to claim 15, wherein a resistance to heat transfer from power electronics of the electronic circuit through a corrugated region of a housing of the compact drive to ambient air is less than a resistance to heat transfer from the power electronics through a planar region of the housing to ambient air.

20. A compact drive, comprising:
    a housing including at least two housing parts and at least one housing cover;
    an electric motor arranged in the housing and having a rotor shaft supported by bearings arranged in at least one of the housing parts;
    a transmission arranged in the housing and including an output shaft and at least one intermediate shaft, the output shaft supported by bearings arranged in the at least one housing part in which the bearings supporting the rotor shaft are arranged;
    a frequency converter; and
    wherein:
    the output shaft of the transmission, the at least one intermediate shaft of the transmission and the rotor shaft of the electric motor are arranged in parallel, a shaft-center distance determined in accordance with at least one transmission stage;
    the frequency converter is arranged laterally in a direction orthogonal with respect to the rotor shaft; and
    the two sides of the output shaft are accessible to provide a two-sided power take-off.

* * * * *